Oct. 12, 1948.  E. W. OETH  2,451,236
TRAILER FOR BOAT HANDLING
Filed Nov. 5, 1946
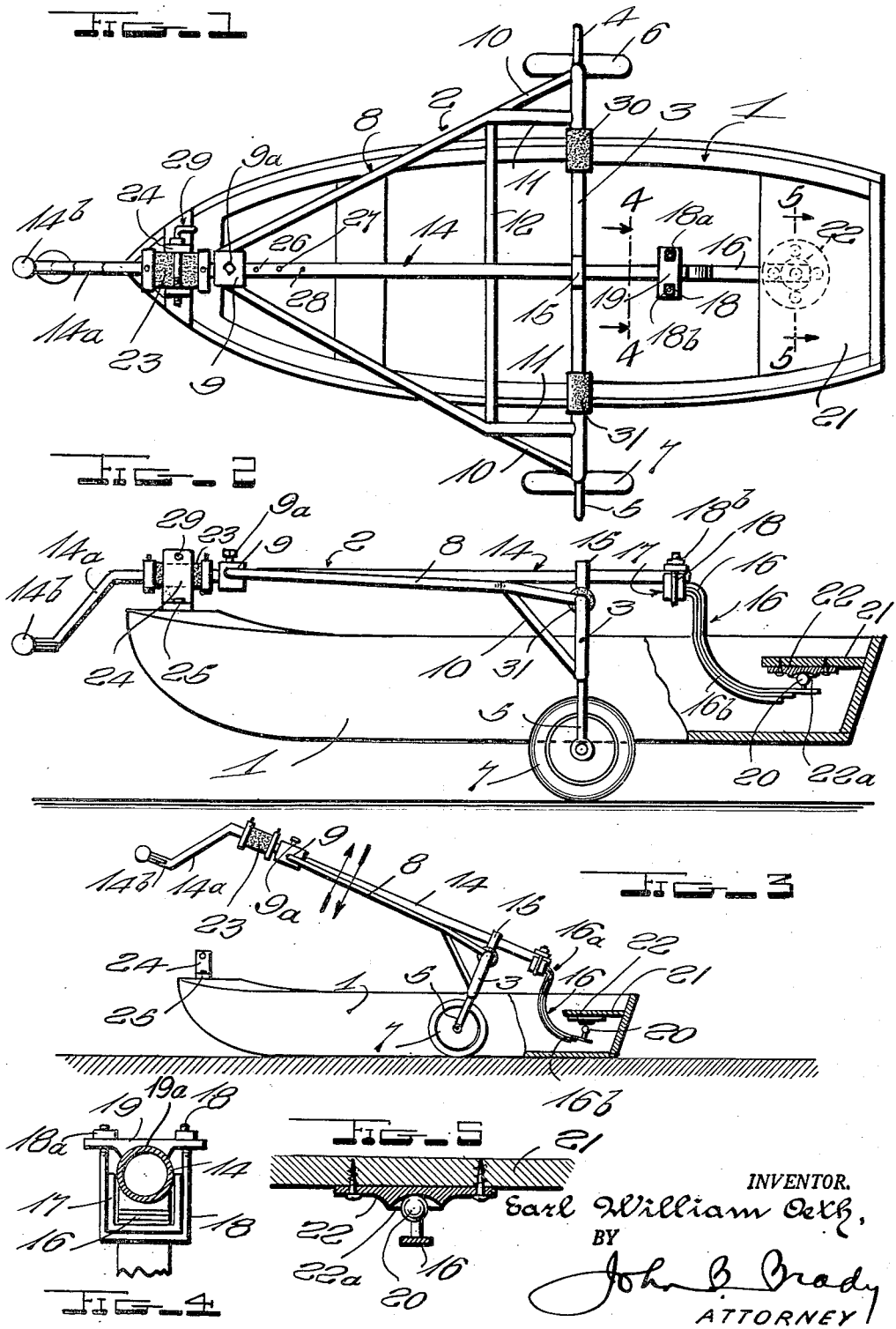
INVENTOR.
Earl William Oeth,
BY
John B. Brady
ATTORNEY Patented Oct. 12, 1948

2,451,236

UNITED STATES PATENT OFFICE 2,451,236

TRAILER FOR BOAT HANDLING

Earl William Oeth, Evansville, Ind., assignor of one-third to Ruby A. Oeth, Evansville, Ind.

Application November 5, 1946, Serial No. 707,898

5 Claims. (Cl. 280—33.4)

My invention relates broadly to boat handling equipment and more particularly to an improved construction of trailer for attachment to a vehicle for transporting and launching boats.

One of the objects of my invention is to provide an improved construction of suspension means for a trailer for supporting a boat thereon for facilitating transportation and launching of the boat.

Still another object of my invention is to provide a construction of resilient suspension for supporting a boat with respect to a trailer in which the suspension is of extremely simple and practical structure.

A further object of my invention is to provide an arrangement of hardware for installation upon boats for facilitating the connection of a trailer therewith in transporting, launching and retrieving a boat.

Other and further objects of my invention reside in an improved construction of hardware and resilient suspension means for interconnecting a trailer and a boat as set forth more fully in the specification hereinafter following by reference to the accompanying drawings in which:

Figure 1 is a top plan view showing a boat suspended with respect to a trailer and ready for transportation and/or launching; Fig. 2 is an elevational view of the trailer and boat suspension means associated therewith, the boat being partially broken away and illustrated in cross section for showing the arrangement of hardware carried by the boat and associated with the resilient suspension means carried by the trailer; Fig. 3 is a schematic view illustrating the manner of releasing the boat from the trailer frame preparatory to a launching operation and/or retrieving the boat preparatory to transportation thereof; Fig. 4 is a fragmentary transverse sectional view taken on line 4—4 of Fig. 1; and Fig. 5 is a fragmentary sectional view taken on line 5—5 of Fig. 1.

Referring to the drawings in detail reference character 1 designates a boat which is to be transported and launched and/or retrieved by means of the trailer represented generally at 2. The trailer 2 comprises a substantially U-shaped frame 3 terminating at opposite ends in yoke portions 4 and 5 in which wheels 6 and 7 are journalled. The trailer 2 includes a substantially Y-shaped frame portion 8 which terminates at the apex thereof in a cylindrical sleeve-like portion 9 and which is reinforced by structural members illustrated at 10, 11 and 12.

The sleeve-like member 9 provides a mounting means for the adjustable longitudinally extending beam 14 which extends through the circular guide member 15 supported by the substantially U-shaped frame 3 and projects behind the frame 3 to a position for supporting the suspension spring 16. The suspension spring 16 consists of a multiplicity of flat leaf spring members mutually supporting each other and embraced by a yoke member 17 the interior opposite sides of which extend substantially tangent to the opposite sides of the beam 14 as illustrated more clearly in Fig. 4. The yoke 17 is clamped and confined with respect to the beam 14 by means of a substantially yoke-shaped bolt member 18 which passes around the yoke-shaped member 17 with the opposite ends thereof projecting through the end plate 19 as shown in Fig. 4. The end plate 19 is provided with a shaped face portion 19a which conforms with the contour of the beam 14 enabling the yoke member 17 and the leaf springs 16 secured thereby to be securely fastened adjacent the end of the beam 14. Confining nuts 18a and 18b are engaged over the screw-threaded ends of the yoke shaped bolt member 18 and engaged against the plate 19 for insuring a rigid engagement between the end of spring member 16 and the beam 14.

The spring 16 is composed of a multiplicity of stacked flat spring strips which conjointly support the load of the trailer and any load carried by the trailer. The free end of the spring 16 terminates in a load engaging member 20. The load engaging member 20 coacts with hardware permanently mounted on the boat 1. In the arrangement shown the transversely extending stern portion 21 of the boat 1 is provided with a central plate 22 which is recessed at 22a to detachably receive the load engaging member 20.

The spring 16 is shaped to provide a substantially right angularly bent portion at 16a connected with a downwardly curved portion 16b which supports the load engaging member 20.

The opposite end of the beam 14 is provided with an adjustable shock absorbing sleeve represented at 23 which is adapted to detachably enter the yoke-shaped member 24 which is secured adjacent the bow of the boat 1. The yoke-shaped member 24 is permanently fastened adjacent the bow of the boat 1 by suitable means such as bolts 25. The beam 14 carrying shock absorbing sleeve 23 extends downwardly as represented at 14a and terminates in a coupling portion 14b at the end thereof. Coupling portion 14b is arranged to connect with the vehicle for pulling or pushing the trailer during transportation or during the launching or retrieving operation.

The longitudinally extending beam 14 is adjustable through sleeves 9 and 15 for lengthening or shortening the projection of beam 14 with respect to the substantially U-shaped frame 3 of the trailer. Thus the trailer may be adapted for transporting, launching and/or retrieving boats of differing lengths. When the proper length of beam 14 has been determined set screw 9a in sleeve 9 is engaged through the proper aperture in beam 14 which I have represented at 26, 27 and 28 in Fig. 1.

The shock absorbing sleeve 23 may be detachably secured in yoke 24 by means of confining pin 29 which is passed through yoke 24 as soon as the beam 14 is moved to the position within yoke 24 as represented in Figs. 1 and 2.

In Fig. 3 I have shown schematically the manner of launching and/or retrieving the boat. When releasing the boat from the trailer pin 29 is removed from yoke 24 permitting the beam 14 to be elevated in the position illustrated in Fig. 3 with the centers of the axles of wheels 6 and 7 as an axis. The load engaging member 20 is freed from hardware 22 as illustrated in Fig. 3 whereupon the trailer which straddles the boat 1 may be drawn clear of the boat. When this operation is performed at the beach with the boat 1 partially submerged in the water the trailer may be withdrawn from the boat up the beach and the boat pushed into the water for launching.

In retrieving the boat the trailer is pushed into the water in a position straddling the boat and with the longitudinally extending beam 14 tipped upwardly in the manner illustrated in Fig. 3. Thus the load engaging member 20 on the end of spring 16 may be engaged beneath the plate 22 and the beam 14 then lowered to engage the shock absorbing sleeve 23 within yoke 24. The shock absorbing sleeve 23 is then confined in yoke 24 by sliding pin member 29 therethrough. The operation of lowering beam 14 about the axes of wheels 6 and 7 has the result of raising the boat 1. By connecting the end 14b of beam 14 to a vehicle the trailer is ready for transportation with the boat 1 elevated from the highway. In the event that the boat 1 should sway or rock within the trailer frame, the gunwales are protected by the cushion effect provided by sleeve-like shock absorbers 30 and 31 carried by frame 3 of the trailer.

In addition to the load offered by the boat itself it is entirely possible to use the boat as a carrier for camping and other equipment as the loading thus imposed is amply compensated by the resiliency imparted by the leaf spring 16.

The fact that leaf spring member 16 is directly aligned with the longitudinal axis of beam 14 greatly facilitates the mechanical assembly of the spring and trailer and simplifies the alignment of the trailer with the boat in a launching or a retrieving operation.

The hardware 22 and 24 are permanent fixtures on the boat and coact with the complementary parts of the trailer, that is, load engaging member 20 and the shock absorbing sleeve 23.

While I have described my invention in one of its preferred embodiments I realize that modifications in structure and arrangement may be made and I desire that it be understood that I intend no limitations upon my invention other than may be imposed by the scope of the appended claims.

What I claim and desire to secure by Letters Patent of the United States is as follows:

1. A trailer for handling boats comprising in combination with a boat having supporting hardware extending in a substantially horizontal plane thereon, a wheeled support having a single centrally disposed longitudinally extending beam, a multiple leaf spring connected with the end of said beam projecting beneath the plane of said hardware and terminating in an end support engageable in a single point support beneath the hardware on the boat.

2. A trailer for handling boats comprising in combination with a boat having supporting hardware extending in a substantially horizontal plane thereon, a wheeled support straddling the boat and including a single centrally disposed longitudinally extending beam, a yoke mounted adjacent the bow of the boat, said hardware comprising a bearing plate mounted adjacent the stern of the boat, a spring member fastened to the end of said beam and extendible beneath the horizontal plane of said hardware and detachably engageable with said bearing plate, and shock absorbing means carried by said beam and detachably engageable with said yoke adjacent the bow of the boat.

3. A trailer for handling boats comprising in combination with a boat, a wheeled support straddling said boat and having a single centrally disposed longitudinally extending beam projecting over the boat, a flat spring member extending in alignment with said beam, a load supporting terminus on said spring member and a hardware plate secured to said boat and having a recess therein for receiving said load supporting terminus, the load supporting terminus on said flat spring member being detachably engageable with the hardware plate on said boat.

4. A trailer for handling boats comprising in combination with a boat having supporting hardware thereon, a wheeled support straddling said boat and having a single centrally disposed longitudinally extending beam projecting over the boat, a depending spring member connected with the end of said beam and aligned therewith, a load supporting member carried by the end of said spring member and a coacting inverted socket-like member carried by said boat said load supporting member on said spring member being detachably engageable with the inverted socket-like member on said boat.

5. A trailer for handling boats comprising in combination with a boat having supporting hardware thereon, a wheeled support straddling said boat and having a single, centrally disposed longitudinally extending beam projecting over the boat, a spring member connected at one end with the end of said beam and projecting in alignment with the longitudinal axis thereof and curved downwardly therefrom, said spring member terminating in an upwardly extending supporting member and a plate member carried by said boat, said plate member being recessed to receive said upwardly extending supporting member and said supporting member being detachably engageable with the plate member carried by said boat.

EARL WILLIAM OETH.

REFERENCES CITED

The following references are of record in the file of this patent:

UNITED STATES PATENTS

| Number | Name | Date |
|---|---|---|
| 1,655,454 | Clay | Jan. 10, 1928 |
| 2,260,676 | Lafaye | Oct. 28, 1941 |
| 2,375,754 | Ballinger | May 15, 1945 |